United States Patent
Chen et al.

(10) Patent No.: US 10,705,557 B2
(45) Date of Patent: Jul. 7, 2020

(54) ON-CHIP CLOCK GENERATOR CALIBRATION

(71) Applicant: QUALCOMM Incorporated, San Diego, CA (US)

(72) Inventors: ZhenQi Chen, South Boston, MA (US);
Jianguo Yao, Londonderry, NH (US);
Scott Davenport, Merrimack, NH (US);
Helena Deirdre O'Shea, San Diego, CA (US); Reza Mohammadpourrad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 15/942,191

(22) Filed: Mar. 30, 2018

(65) Prior Publication Data
US 2019/0302830 A1 Oct. 3, 2019

(51) Int. Cl.
*G06F 1/00* (2006.01)
*G06F 1/04* (2006.01)

(52) U.S. Cl.
CPC ..................................... *G06F 1/04* (2013.01)

(58) Field of Classification Search
CPC ................. G06F 1/04; G06F 1/08; G06F 1/12
See application file for complete search history.

(56) References Cited

U.S. PATENT DOCUMENTS

| 7,505,540 | B2 | 3/2009 | Fernald |
| 8,774,735 | B2 | 7/2014 | Kadam et al. |
| 9,154,142 | B2 | 10/2015 | Dobbs et al. |
| 9,450,687 | B2 | 9/2016 | Munoz-Acevedo et al. |
| 10,248,612 | B2 * | 4/2019 | Ross ................... G06F 13/4291 |
| 2009/0307517 | A1 * | 12/2009 | Fehr ..................... H04B 1/7156 713/500 |
| 2015/0220472 | A1 | 8/2015 | Sengoku |

* cited by examiner

*Primary Examiner* — Xuxing Chen
(74) *Attorney, Agent, or Firm* — Loza & Loza LLP

(57) ABSTRACT

Systems, methods, and apparatus for internal on-chip clock calibration for devices coupled to a serial bus are described. A data line of the bus is monitored at a device in order to detect select command signals on the data line, where the select command signals have an accompanying clock signal, such as a burst clock, on a clock line of the serial bus sent concurrently with the command signal. The internal on-chip clock generator in the receiving device utilizes the clock signal occurring with the command signal for calibration, where the select signals are those signals sufficiently long enough for a receiving device to effectively utilize the concurrent clock signal for calibration purposes. In this manner, clock calibration for an internal clock is maintained accurately without the need for an extra clock calibration input.

30 Claims, 11 Drawing Sheets

ON-CHIP CLOCK GENERATOR CALIBRATION

TECHNICAL FIELD

The present disclosure relates generally to calibration of a clock generator in a peripheral device via an interface between a processing circuit and the peripheral device and, more particularly, to calibration of an auto-tuned clock generator, which is on-chip in the peripheral device, using clock signals accompanying command signals on the interface.

INTRODUCTION

Mobile communication devices may include a variety of components including circuit boards, integrated circuit (IC) devices and/or System-on-Chip (SoC) devices. The components may include processing circuits, user interface components, storage, RF modems and circuitry, and other peripheral components that may communicate through serial buses. Such serial buses may operate in accordance with a standardized or proprietary protocol, such as I2C or I3C, as examples.

In one particular example, a bus or interface protocol has been developed by the Mobile Industry Processor Interface (MIPI) alliance for control of radio frequency (RF) slave devices or components in mobile communication devices. This protocol, termed the MIPI RF Front-End Interface (i.e., MIPI RFFE$^{SM}$), is a dedicated control interface for the RF front end of a mobile device, which typically has higher performance requirements and can include 10 or more devices or components such as transmitting power amplifiers, receiving low noise amplifiers (LNAs), antenna tuners, filters, and switches. The RFFE interface can be applied to the full range of RF front-end components to simplify product design, configuration and integration, and to facilitate interoperability of components.

In certain aspects, the MIPI RFFE bus only provides a short burst clock while an active command is sent, making it difficult to use such temporal clocks in calibration of timing for RFFE slave devices. Known MIPI RFFE slave devices typically handle timed logic with either an extra external reference clock, which costs one more pin on the chip and one more routing to the chip on a PCB, or an internal free-run oscillator, which typically suffers a large variation in frequency due to product, voltage, temperature (PVT) variations. Accordingly, there is a need to handle clocking or timing logic with less frequency variation in front end slave devices interfaced via an RFFE bus.

SUMMARY

Certain aspects of the disclosure relate to systems, apparatus, methods and techniques that perform on-chip clock calibration using a serial bus.

According to an aspect, a method for clock calibration of an on-chip clock generator in a device using a serial bus is disclosed. The method features monitoring a data line of the serial bus for detecting a select command signal, where the select command signal has an accompanying clock signal on a clock line of the serial bus that is sent concurrent with at least a portion of the command signal. Further, the method includes calibrating the on-chip clock generator using the clock signal occurring with the select command signal.

According to another aspect, a device coupled to a serial bus is disclosed that includes an on-chip clock generator. In turn, the on-chip generator includes a command detector configured to monitor a data line of the serial bus for detecting a select command signal, where the command signal has an accompanying clock signal on a clock line of the serial bus that is sent concurrent with at least a portion of the command signal. The on-chip generator also include a tunable oscillator providing an internal clock signal for the device, a first counter configured to count cycles of the internal clock signal output from the tunable oscillator during at least a portion of the duration of the select command signal, and a second counter configured to count cycles of the clock signal on the clock line of the serial bus during at least the portion of the duration of the select command signal. Further, the on-chip clock generator includes a tuning circuit configured to adjust the frequency of the tunable oscillator based on a comparison of the counted clock cycles from the first and second counters.

In yet another aspect, the present disclosure discloses an apparatus having a bus interface configured to couple the apparatus to a serial bus having a first line configured to carry a clock signal and a second line configured to carry data and command signals, and an on-chip clock generator for providing an internal clock signal for the apparatus. Additionally, the apparatus features a controller configured to monitor the second line of the serial bus for detecting a select command signal, where the select command signal has an accompanying clock signal on the first line of the serial bus that is sent concurrent with at least a portion of the command signal, and then calibrate the on-chip clock generator using the clock signal occurring with the select command signal.

According to a further disclosed aspect, an apparatus for clock calibration of an on-chip clock generator in a device using a serial bus includes means for monitoring a data line of the serial bus for detecting a select command signal, where the select command signal has an accompanying clock signal on a clock line of the serial bus that is sent concurrent with at least a portion of the command signal, and means for calibrating the on-chip clock generator using the clock signal occurring with the select command signal.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the present methods and apparatus will now be presented in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware, software, or firmware depends upon the particular application and design constraints imposed on the overall system.

Exemplary Apparatus with Multiple IC Device Subcomponents

Figure 1:
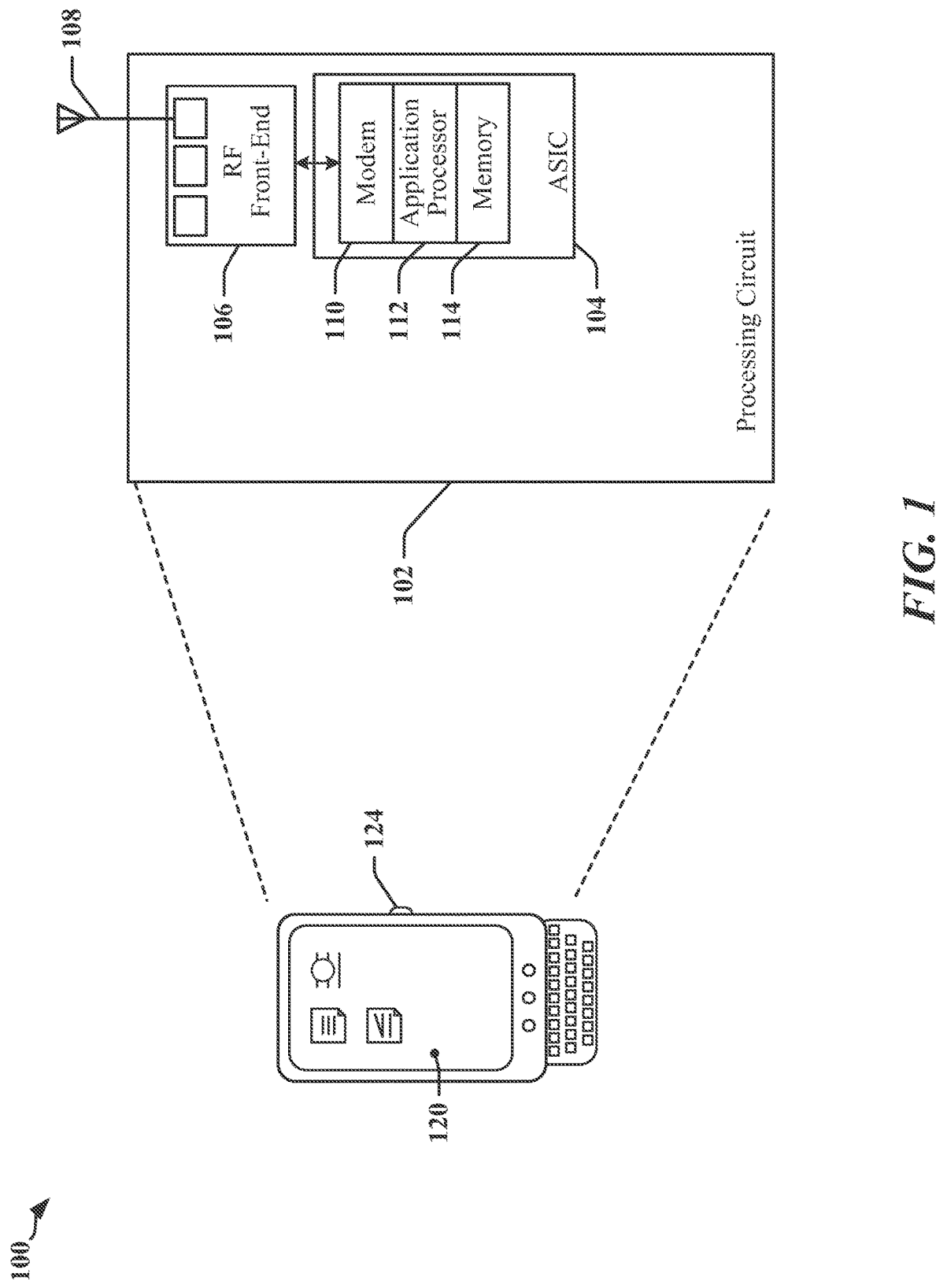
FIG. 1 illustrates an apparatus that includes a RF front end (RFFE) system that may be adapted according to certain aspects disclosed herein.

Certain aspects of the presently disclosed methods and apparatus may be applicable to communications links deployed between electronic devices that include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may be a mobile communication device. The apparatus 100 may include a processing circuit 102 having two or more IC devices 104, 106 that may be coupled using a first communication link One IC device may be an RF front end device 106 that enables the apparatus to communicate through one or more antennas 108 with a radio access network (RAN), a core access network, the Internet and/or another network. The RF front end device 106 may include a plurality of devices coupled by a second communication link, which may include an RFFE bus.

In a further aspect, the processing circuit 102 may include one or more application-specific IC (ASIC) devices, such as IC device 104. In one example, device 104 may be an ASIC device 104 including (as illustrated) or coupled with one or more processing devices 112, logic circuits, one or more modems 110, and processor readable storage such as a memory device 114 that may maintain instructions and data executable by a processor on the processing circuit 102. The processing circuit 102 may be controlled by one or more of an operating system and an application programming interface (API) layer that supports and enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Overview of the RFFE Bus

Figure 2:
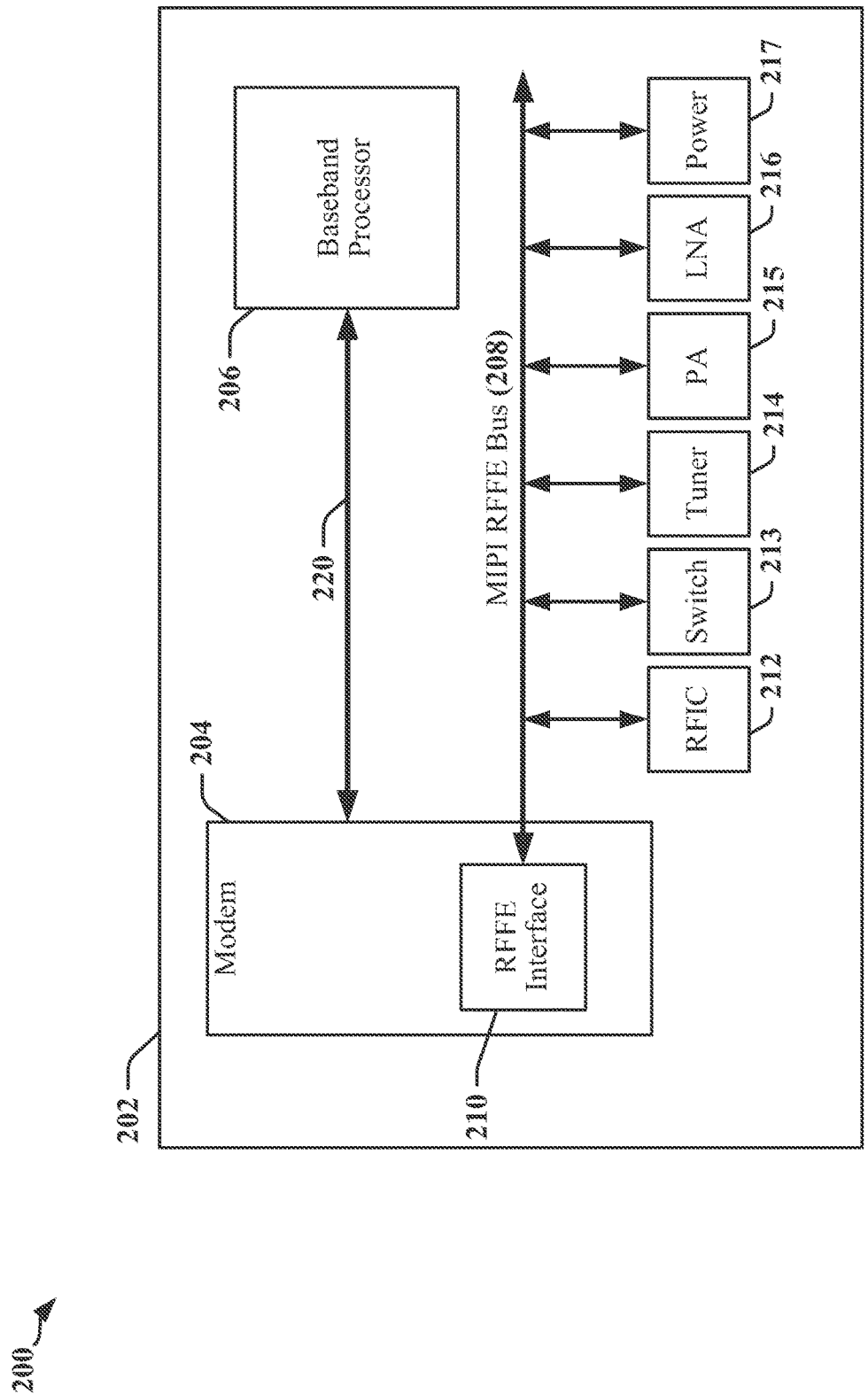
FIG. 2 is a block diagram illustrating a device that employs an RFFE bus or interface to couple various front end devices.

FIG. 2 is a block diagram 200 illustrating an example of a device 202 that employs an RFFE, bus 208 to couple various front end devices 212-217. A modem 204 including an RFFE interface 210 may also be coupled to the RFFE bus 208. In various examples, the device 202 may be implemented with one or more baseband processors 206, one or more other communication links 220, and various other buses, devices and/or different functionalities. In the example, the modem 204 may communicate with a baseband processor 206, and the device 202 may be embodied in one or more of a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smart watch, a health or fitness tracker, eyewear, etc.), an appliance, a sensor, a security device, a vending machine, a smart meter, a drone, or any other similar functioning device.

The RFFE bus 208 may be coupled to an RF integrated circuit (RFIC) 212, which may include one or more controllers and/or processors that configure and control certain aspects of the RF front end. The RFFE bus 208 may couple the RFIC 212 to a switch 213, an RF tuner 214, a power amplifier (PA) 215, a low noise amplifier (LNA) 216, and a power management module 217.

In an example, the baseband processor 206 may be a master device. The master device/baseband processor 206 may drive the RFFE bus 208 to control the various front end devices 212-217. During transmission, the baseband processor 206 may control the RFFE, interface 210 to select the power amplifier 215 for a corresponding transmission band. In addition, the baseband processor 206 may control the switch 213 so that the resulting transmission may propagate from an appropriate antenna. During reception, the baseband processor 206 may control the RFFE interface 210 to receive from the low noise amplifier 216 depending on the corresponding transmission band. It should be appreciated that numerous other components may be controlled through the RFFE bus 208 in this fashion such that the device 202 is merely representative and not limiting. Moreover, other devices such as the RFIC 212 may serve as an RFFE master device in alternative embodiments.

Figure 3:
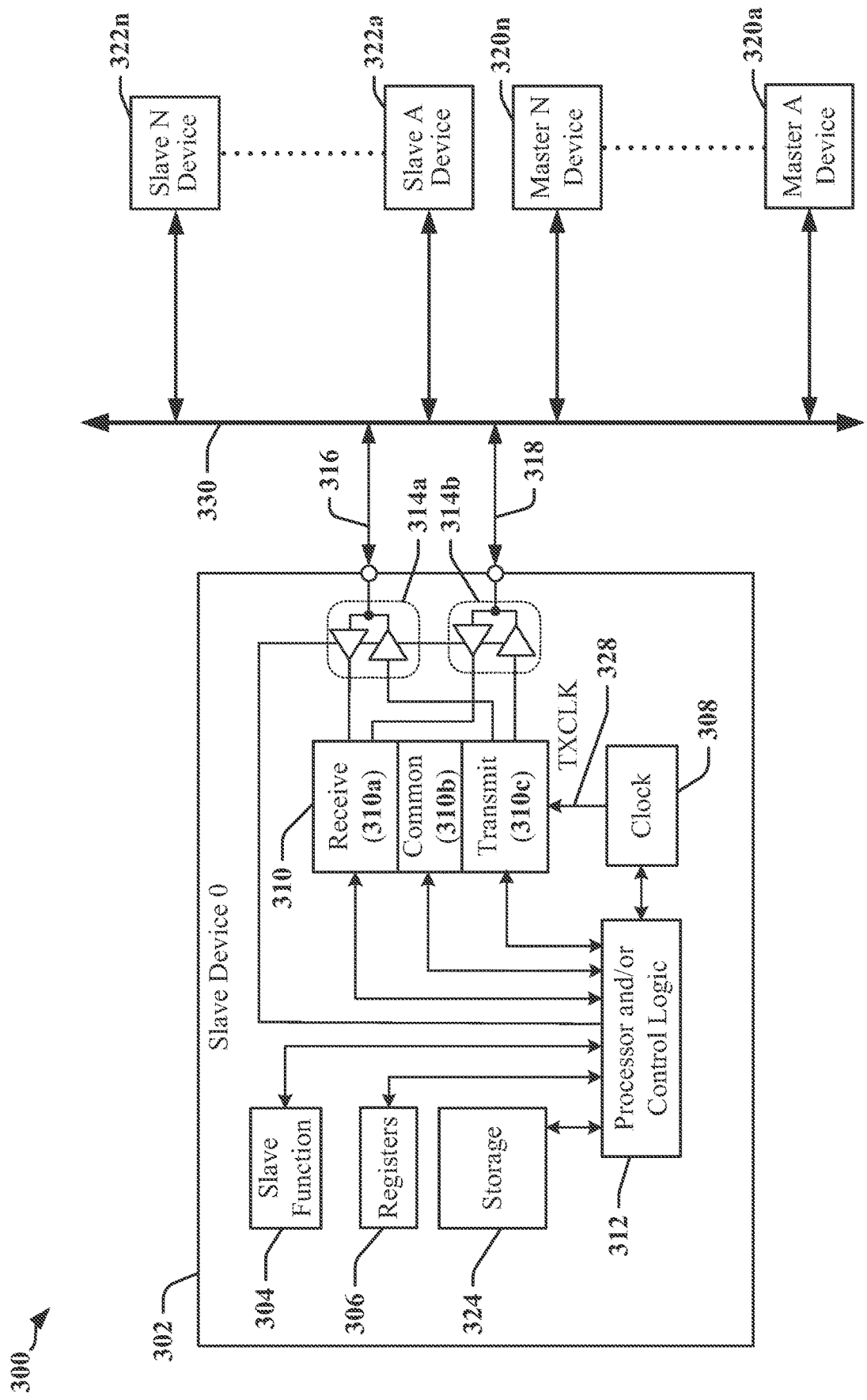
FIG. 3 illustrates an example of a system architecture for an apparatus employing a data link between master and slave devices using an RFFE bus or interface according to certain aspects disclosed herein.

FIG. 3 is a block schematic diagram illustrating an example of an architecture for a device 300 that may employ an RFFE bus 330 to connect bus master devices 320*a*-320*n* and slave devices 302 and 322*a*-322*n*. The RFFE bus 330 may be configured according to application needs, and access to multiple buses 330 may be provided to certain of the devices 320*a*-320*n*, 302, and 322*a*-322*n*. In operation, one of the bus master devices 320*a*-320*n* may gain control of the bus and transmit a slave identifier (slave address) to identify one of the slave devices 302 and 322a-322n to engage in a communication transaction. Bus master devices 320a-320n may read data and/or status from slave devices 302 and 322a-322n, and may write data to memory or may configure the slave devices 302 and 322a-322n. Configuration may involve writing to one or more registers or other storage on the slave devices 302 and 322a-322n.

In the example illustrated in FIG. 3, a first slave device 302 coupled to the RFFE bus 330 may respond to one or more bus master devices 320a-320n, which may read data from, or write data to the first slave device 302. In one example, the first slave device 302 may include or control a power amplifier (See e.g., PA 215 in FIG. 2), and one or more bus master devices 320a-320n may from time-to-time configure a gain setting at the first slave device 302.

The first slave device 302 may include RFFE registers 306 and/or other storage devices 324, a processing circuit and/or control logic 312, a transceiver 310 and an interface including a number of line driver/receiver circuits 314a, 314b as needed to couple the first slave device 302 to the RFFE bus 330, e.g., via a serial clock line (SCLK) 316 and a serial data line (SDATA) 318. The processing circuit and/or control logic 312 may include a processor such as a state machine, sequencer, signal processor or general-purpose processor. The interface may be implemented using the state machine. Alternatively, the interface may be implemented in software on a suitable processor if included in the first slave device 302. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TXCLK) signal 328 may be provided to the transmitter 310c, where the TXCLK signal 328 can be used to determine data transmission rates.

The RFFE bus 330 is typically implemented as a serial bus in which data is converted from parallel to serial form by a transmitter, which transmits the encoded data as a serial bitstream. A receiver processes the received serial bitstream using a serial-to-parallel convertor to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the RFFE bus 330.

To control the slave devices 302 and 322a-322n, a master device (e.g., one of master devices 320a-320n) either writes or reads to RFFE registers within the slave devices, e.g., the RFFE registers 306 within the first slave device 302. The RFFE registers 306 may be arranged according to an RFFE register address space that ranges from a zeroth (0) address to a 65535 address. In other words, each slave device might include up to 65,536 registers. To address such a number of registers, 16 register address bits for each of the slave devices 302 and 322a-322n are required. The master device may read from or write to the registers 306 in each slave device using one of the three types of commands discussed above (register command, extended register command, or extended register long command) For example, the register command addresses only the first 32 registers 306 in the address space for each of the slave devices 302 and 322a-322n. In this fashion, the register command requires only five register address bits. In contrast, the extended register command may initially access up to the first 256 registers in each of the slave devices 302 and 322a-322n. A corresponding 8-bit register address for the extended register command acts as a pointer in that the data payload for the extended register command may include up to 16 bytes. A corresponding read or write operation for an extended register command may thus extend across 16 registers starting from the register identified by the 8-bit register address. The extended register long command includes a 16-bit register address which may act as a pointer to any of the possible 65,536 registers in each slave device. The data payload for an extended register long command may include up to eight bytes so that the corresponding read or write operation for the extended register long command may extend across eight registers starting from the register identified by the 16-bit address. In an aspect of the disclosure, up to 15 slave devices may be coupled to one RFFE, bus. If a front end includes more than 15 slave devices, additional RFFE busses may be provided.

The RFFE standard specifies that the serial bus or interface includes a clock line and a bidirectional data line. Through the RFFE bus, an RFFE master device may read from, and write to, registers in a plurality of RFFE slave devices so as to control the RF front end devices. The read and write commands are organized in the RFFE standard into protocol messages that may each include an initial sequence start condition (SSC), a command frame, a data payload, and a final bus park cycle (BPC). The protocol messages include register commands, extended register commands, and extended register long commands. The protocol messages may further include broadcast commands. The register, extended register, and extended register long commands (three types of commands) can all be either read or write commands. With regard to the three types of commands, the registers in each of the RFFE slave devices are organized into a 16-bit wide address space (0x0000-0xFFFF in hexadecimal). Each of the three types of commands includes a command frame that addresses a specific RFFE slave device as well as the register address. A command frame in the register command (register command frame) is directed to the registers in the first five bits of an address space (0x00-0x1F) such that only five register address bits are needed. The register command frame is followed by an 8-bit data payload frame. In contrast, an extended register command frame includes eight register address bits and may be followed by up to 16 bytes of data. Finally, an extended register long command frame includes a full 16-bit register address so it can uniquely identify any register in the addressed RFFE slave device. The extended register long command frame may be followed by up to eight bytes of data.

Each of the commands begins with a unique sequence start condition (SSC) that is then followed by a corresponding command frame, some number of data frames, and finally a bus park cycle (BPC) to signal the end of the command. The latency involved with transmitting any of the commands thus depends on the number of bits in its various frames as well as the clocking speed for the RFFE clock line. Under the RFFE protocol, each bit of a transmitted frame corresponds to a period of the clock since the transmission is single data rate (SDR), which corresponds to one bit per clock cycle. For example, an SDR results from transmitting a bit responsive to each rising edge (or to just the falling edges) of the clock. The maximum clocking speed is 52 MHz in the RFFE, v2 specification, for example. This clocking rate has increased relative to previous versions of the RFFE protocol and is associated with increased power consumption.

Each of the three types of RFFE commands—extended register, extended register long, and register—may be either a read or a write command. In general, each write command writes a full byte to each specified register. However, it may be the case that the RFFE master device does not need to change all eight bits in a RFFE slave device register. Furthermore, in many devices, more than one master or radio access technology (RAT) component may share control bit(s) in the same RFFE slave device register. To avoid contaminating the bits corresponding to the "other" source that writes to the same register, a "partial write" operation may be desired. In such a partial write operation, the RFFE master device must first perform a read operation on the selected slave device register using the appropriate one of the three command types. The RFFE master device then knows the current state of all the bits in the corresponding RFFE slave device register. The RFFE master device may then issue an RFFE write command using the appropriate one of the three command types in which the data payload for the corresponding slave device register has the bits it is changing while all the remaining bits stay in their current state as determined by the previous read operation. The need for a read operation prior to the partial write operation increases latency that may violate the latency requirements of certain Radio Access Technologies being implemented in the corresponding RF frontend.

Calibration of On-Chip Clock

According to aspects of the present disclosure, the disclosed methods and apparatus provide calibration of an on-chip timing clock in RFFE devices using aspects inherent to MIPI RFFE interfaces. In particular, the present methods and apparatus utilize select MIPI RFFE burst clock pulses that are associated with commands on the RFFE interface to tune and calibrate a tunable on-chip clock generator for a slave RFFE device coupled to the RFFE interface. The on-chip clock generator utilizes the burst clock pulses of the MIPI RFFE SCLK occurring during select commands as a known reference clock frequency or count of pulses or cycles that may then compared with a frequency or count of a tunable on-chip clock generator or oscillator.

Figure 4:
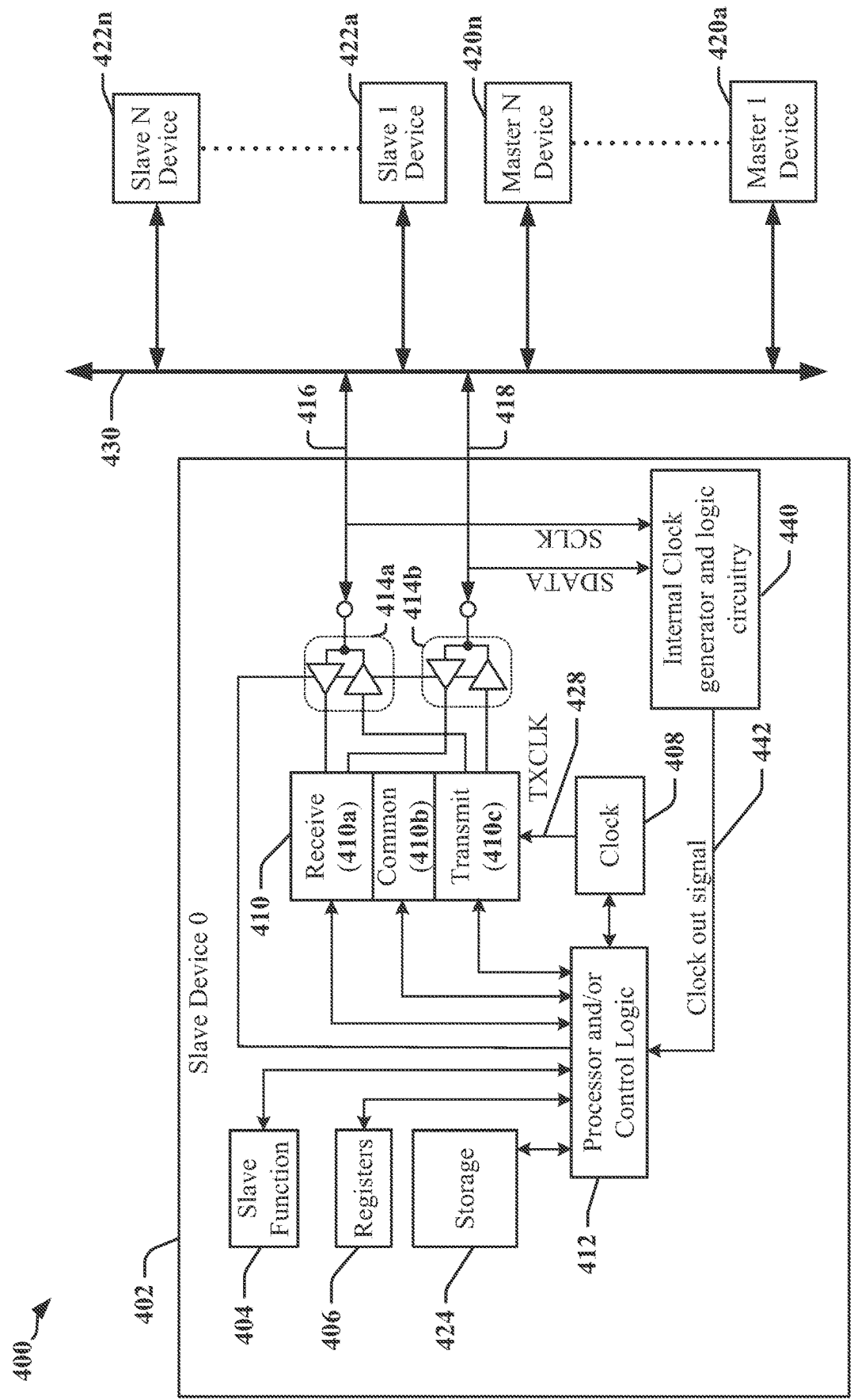
FIG. 4 illustrates another example of a system architecture for an apparatus employing a data link between master and slave devices using an RFFE bus or interface according to certain aspects disclosed herein.

FIG. 4 illustrates a system 400 similar to the system of FIG. 3 that may employ the present methods and apparatus. For sake of brevity, it is noted that system 400 shares elements with those disclosed in the system 300, and a discussion of those elements and their functionality are not repeated here as they are the same as those elements of FIG. 3 discussed above. The system 400 differs from system 300 in that it includes internal on-chip clock generator circuitry 440 that is disposed on-chip within the slave device 402. Circuitry 440, being on-chip, does not receive an external clock calibration signal outside of device 402. Furthermore, circuitry 440 is configured to couple with the SCLK and SDATA lines 416 and 418, respectively. Circuitry 440 may be configured to monitor the SDATA line 418 to determine whether a particular command is present on the line 418. In an aspect, the commands being monitored or detected may include select MIPI commands such as the Extended Register Write or the Extended Register Write Long, with or without batch payloads, as examples. In a further aspect, it is noted that the commands being monitored may preferably be any of a number of MIPI commands that have a greater time pendency, as such commands typically include a longer burst clock period, which is potentially more effective for clock for calibration purposes as the calibration period is longer. Additionally, circuitry 440 is configured to receive input of the clock SCLK from line 416, which is used for tuning or calibrating an oscillator in the clock generator circuitry 440 with additional circuitry for calibration (not shown in FIG. 4), as will be discussed in more detail with respect to FIG. 5.

Figure 5:
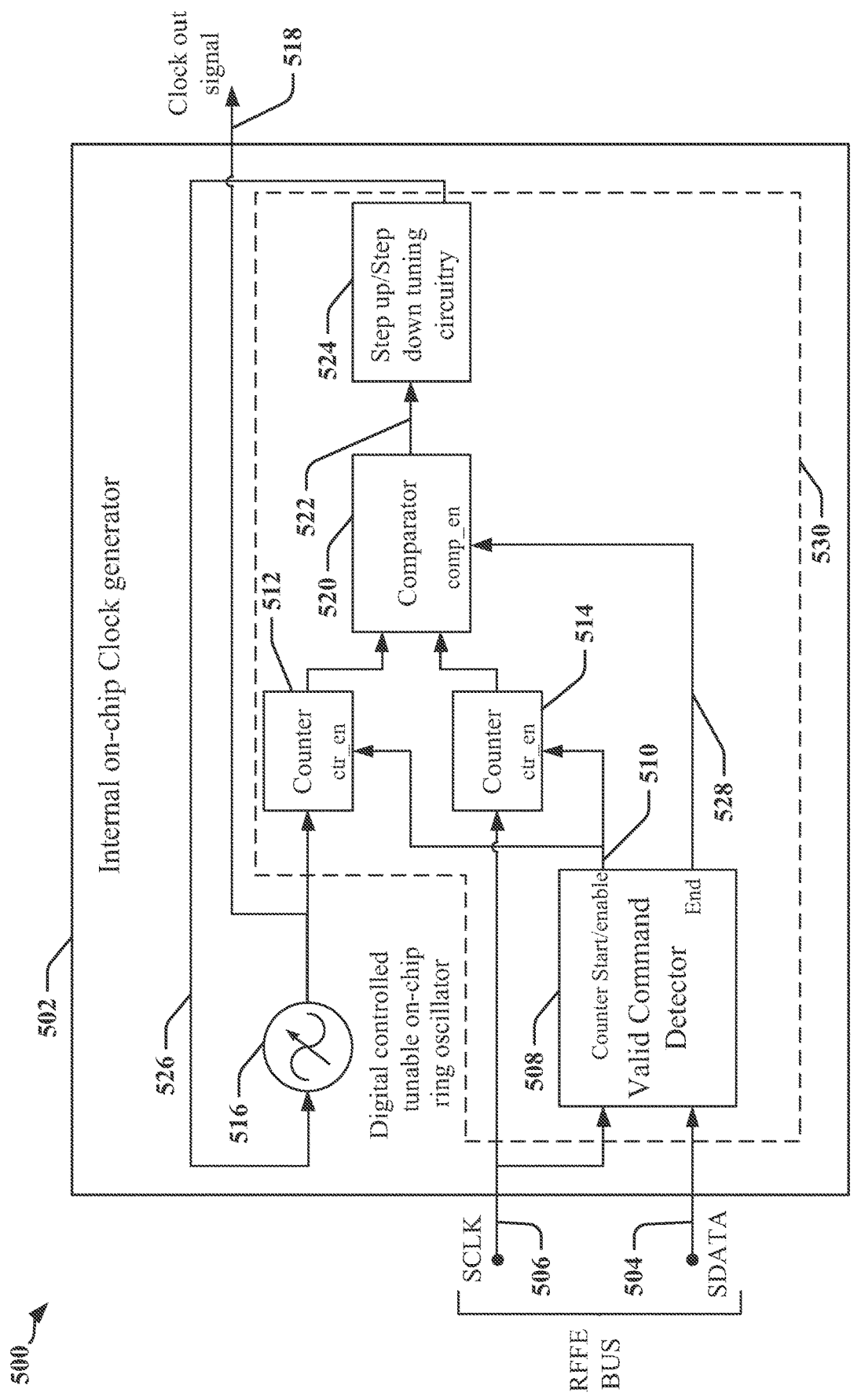
FIG. 5 illustrates a block diagram of a tunable on-chip clock generator circuitry that may be utilized in the system of FIG. 4.

FIG. 5 illustrates an exemplary implementation 500 of a clock generator circuitry, such as circuitry 440 shown in FIG. 4. The clock generator circuitry 502 receives inputs of bus SDATA and SCLK lines 504 and 506, respectively. In particular, these lines 504, 506 are input to a valid command detector 508 configured to determine the type of commands sent over the SDATA line 504, and then make a further determination if the determined command type is one of a number of valid commands that may be utilized for clock calibration. In particular, valid commands may be selected to be those having a longer command time where the burst clock accompanying the command occurs for a longer period, thus providing enough clock cycles to more accurately achieve clock calibration thereby. Where the bus is a MIPI RFFE interface, valid commands may be an Extended Register Write command or an Extended Register Write Long command, with or without a batch payload, as a couple of examples. It is further noted that the valid command detector 508 is configured to identify the correct command type by monitoring the SDATA line and detecting those longer length commands useful for clock calibration based on the frame structure. In a further aspect, the command detection may be independent of the USID information and the clock generator circuitry may utilize any R/W commands that are observed on the bus, even if they are not addresses to the particular slave device.

Figure 6:
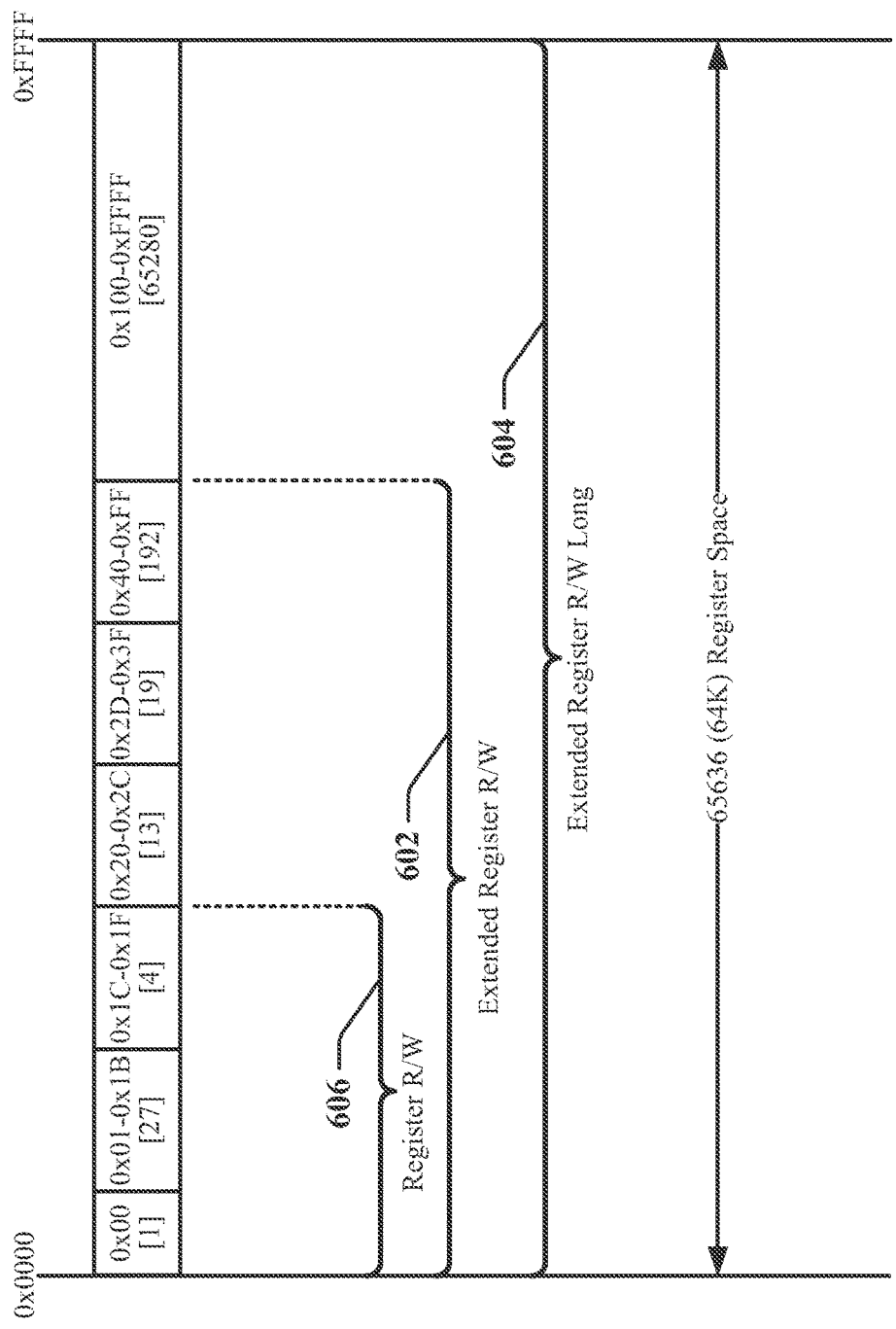
FIG. 6 is a diagram of RFFE slave register space for various RFFE command sequences.

As an illustration of the comparative sizing of various RFFE commands, FIG. 6 is a diagram of an RFFE register space 600 for a slave device couplable to an RFFE interface. The RFFE register space 600 may extend from a register address 0x0000 to register address 0xFFFF in hexadecimal, or 65,636 bytes (also referred to as "64K" as a shorthand way to refer to the size of the register space). The reach of an Extended Register Read/Write command operation may be the space between the 0x00 register and the 0xFF register as shown at 602, and the or an Extended Register Read/Write Long command may occupy the entire 64K register space as shown at 604. In contrast, a register command only occupies the space from register address 0x00 to 0x1F. Accordingly, it can be appreciated from FIG. 6 that the Extended Register or the Extended Register Long commands are better suited for clock calibration as the burst clock accompanying such commands will have more burst clock cycles verses the Register Read/Write command.

Turning back to FIG. 5, the command detector 508 outputs signals including a counter start enable signal 510 that is input to both a first clock counter 512 and a second clock counter 514 to start or enable these counters 512, 514 to begin counting clock cycles. In an aspect, the first clock counter 512 is used to count cycles of a tunable oscillator 516 whose output is the final clock signal 518 output to the other circuitry within the slave device, such as processor and control logic 412 illustrated in FIG. 4. In certain aspects, the tunable oscillator may consist of an RC oscillator, a ring oscillator, or a digital oscillator, as examples. The second clock counter 514 receives the SCLK line 506 and counts clock cycles of the SCLK. The outputs of the counters 512 and 514 are input to a comparator 520 that compares the counts of the counters 512 and 514. The count comparison is used to determine a differential signal 522 or similar signal that indicates whether the digitally tunable oscillator 516 is running at a frequency greater than or less than a predetermined target frequency. The signal 522 is then input to a step up/step down tuning circuitry or logic 524, which is used to determine if the frequency of the oscillator 516 should be stepped up or down dependent on signal 522 from comparator 520 and then output a tuning signal 526 used to digitally tune or adjust the frequency of oscillator 516.

In an aspect, if the count of counter 512 is greater than the count of counter 514, this could indicate that the frequency of oscillator 516 is above the target frequency and that the oscillator frequency needs to be stepped down as determined by the step up/step down tuning circuitry 524, which would issue signal 526 to step down the frequency of the oscillator to move the frequency toward the target frequency. Conversely, if the count of counter 512 is less than the count of counter 514, this would then indicate that the frequency of oscillator 516 is below the target frequency and that the oscillator frequency needs to be stepped up to move the frequency toward the target frequency. It is noted that the comparison of the raw counts of the counters 512 and 514 is not necessarily a comparison of same or close frequencies or cycle counts. That is, the target clock frequency can be set to any ratio to the SCLK frequency. The burst clock SCLK 506 may be some frequency significantly greater or lower than the frequency of oscillator 516, and the desired target frequency for the on-chip oscillator 516. In such case, the frequency or cycle count of SCLK 506 would be known to be some ratio or multiple of the target frequency and the comparator output signal 522 differential value can be correlated or normalized in the step up/step down tuning circuitry 524 to provide the correctly scaled frequency step up or step down needed to adjust the oscillator 516. In one aspect, the step up or step down amounts are predetermined step amounts that may serve to incrementally increase or decrease the frequency of oscillator 516. In an alternative aspect, the step up or step down amounts may be varied dynamically to more quickly or less quickly adjust the oscillator frequency.

Of further note, the valid command detector logic or circuitry 508 may issue a comparator enable signal 528 that is used to start operation of the comparator 520 after a particular command is detected and stop or end the operation when the command is no longer present on the SDATA line 504 (or the accompanying burst clock on the SCLK line 506 is no longer present). Additionally, the system 500 may be configured such that the comparison result of comparator 520 is input to the step-up/step-down logic 524 with each burst clock that accompanies a valid command to provide clock calibration of the oscillator 516 to provide adaptive tuning. This adaptive tuning may occur with each valid MIPI RFFE command on the RFFE bus, wherein frequency drifting that occurs over time from voltage or temperature changes can be tracked and adjusted, accordingly.

In a further aspect, those portions of the circuitry used for calibration, which are shown within block 530 in FIG. 5 and may be a self-sustained logic circuitry within an RFFE device, may be included within the on-chip clock circuitry 502 as shown, or be implemented separate from the clock circuitry 502, and oscillator 516, in particular, yet still within the slave device (e.g., device 402 in FIG. 4). In either case, the on-chip clock circuitry 502 provides a system clock signal 518 that may be used by processor and control logic 412, in one example, or for other functions such as slave function 404 in another example. Still further, it is noted that the methods and apparatus shown in FIGS. 4 and 5 may be extended or applied to MIPI System Power Management Interface (SPMI) applications as well, for example, and is not limited to RFFE applications.

Figure 7:
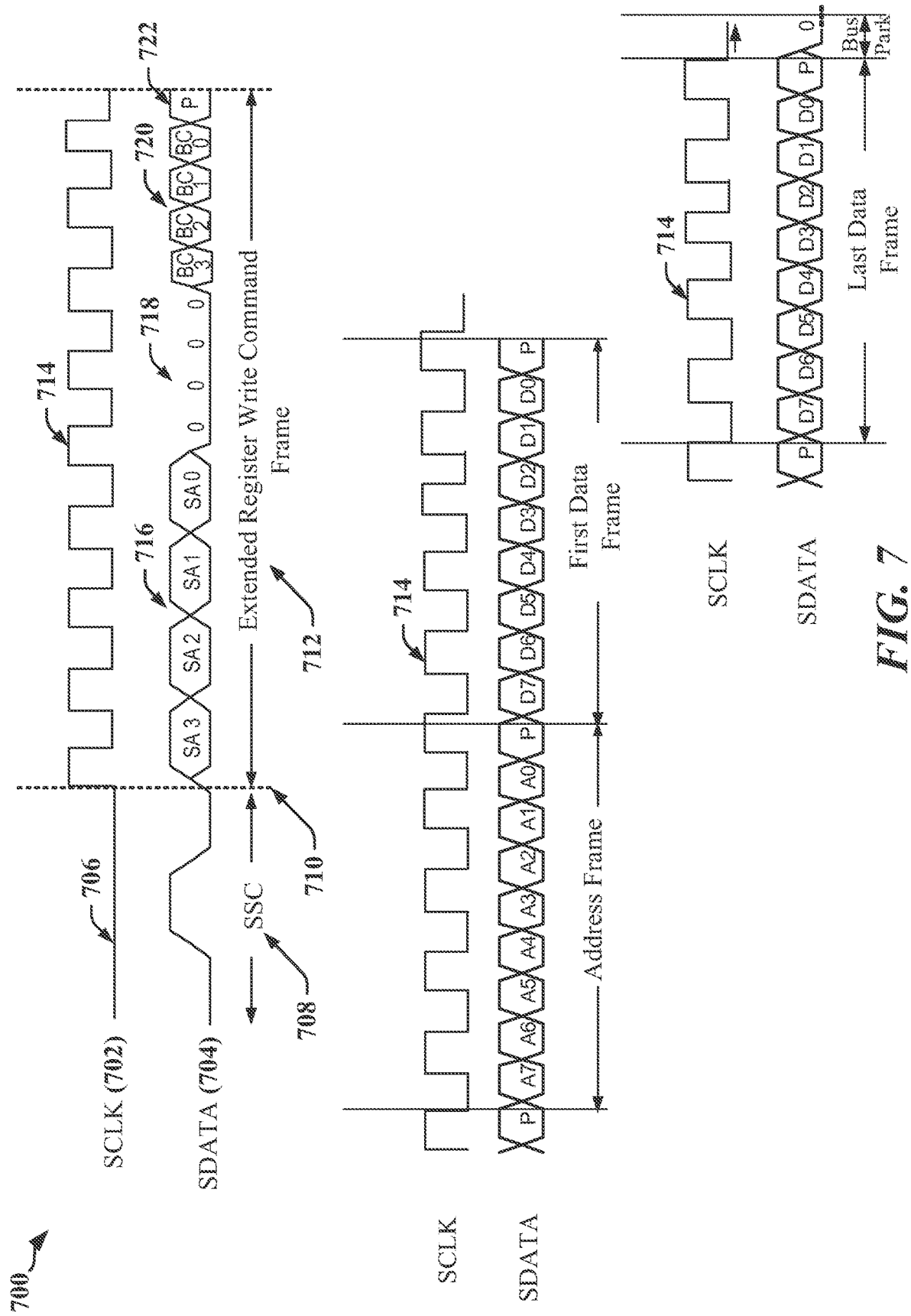
FIG. 7 illustrates a timing diagram that illustrates an example of signaling on a serial bus at the start of an RFFE command.

FIG. 7 is a timing diagram illustrating certain aspects of the timing relationship between signals on the serial data (SDATA) and serial clock (SCLK) wires in an RFFE interface or bus. As illustrated in FIG. 7, the top timing diagram is of an SCLK line 702 and bottom timing diagram is of an SDATA line 704. Prior to the issuance of a command on the SDATA line 704, there is no clock signal on the SCLK line 702 as illustrated at 706; i.e., the line 702 is held at a low voltage state. Prior to the issuance of a command, an initial sequence start condition (SSC) 708 is transmitted by a host or bus master, as an example, on the SDATA line 704 as illustrated by SSC 708 to signal that data will be transmitted. The SCLK line 702 remains low during the SSC. At a time shown at 710, the host or bus master initiates transmission of a command frame 712. In the illustrated example, the command frame 712 constitutes and extended register write command frame. At the same start time 710, a clock burst 714 will be transmitted. For completeness of explanation, it is noted that the command frame 712 includes a slave address or unique slave identifier (USID) 716 comprised of four symbols SA3 to SA0, read/write and symbol command type determination symbols 718, and then bus park cycles (i.e., BC 3-BC 0 as shown in FIG. 7) 720 depending on the type of command, and a parity bit 722. After the command frame, an address frame including slave register address symbols A7-A0 is sent, followed by a number of data frames each having respective symbols (e.g., D7-D0).

In certain aspects, it is noted that an entire command sequence may be used for the clock calibration disclosed herein. The first few cycles of the SCLK clock may be used to identify the correct command type. Once the command type is identified, valid command detector 508 will enable counters 512, 514 and the remaining cycles (i.e., the clock cycles during transmission of address information and data frames) are used for counting the cycles. In other aspects, it is noted that in one mode of operation the oscillator 516 may configured to always be running. In an alternative mode, the oscillator 516 may be selectively disabled when not in use and re-enabled after a new RFFE command is sent with a matching USID for the corresponding slave device. In this case, the oscillator 516 is enabled after the USID is decoded. Since the RC oscillator cannot be turned on instantaneously, there will be a several cycle delay before the counters become valid in this case, and the start of the counters 512, 514 would be delayed by a predetermined N number of cycles to ensure all of the oscillator 516 counts are valid.]

Figure 8:
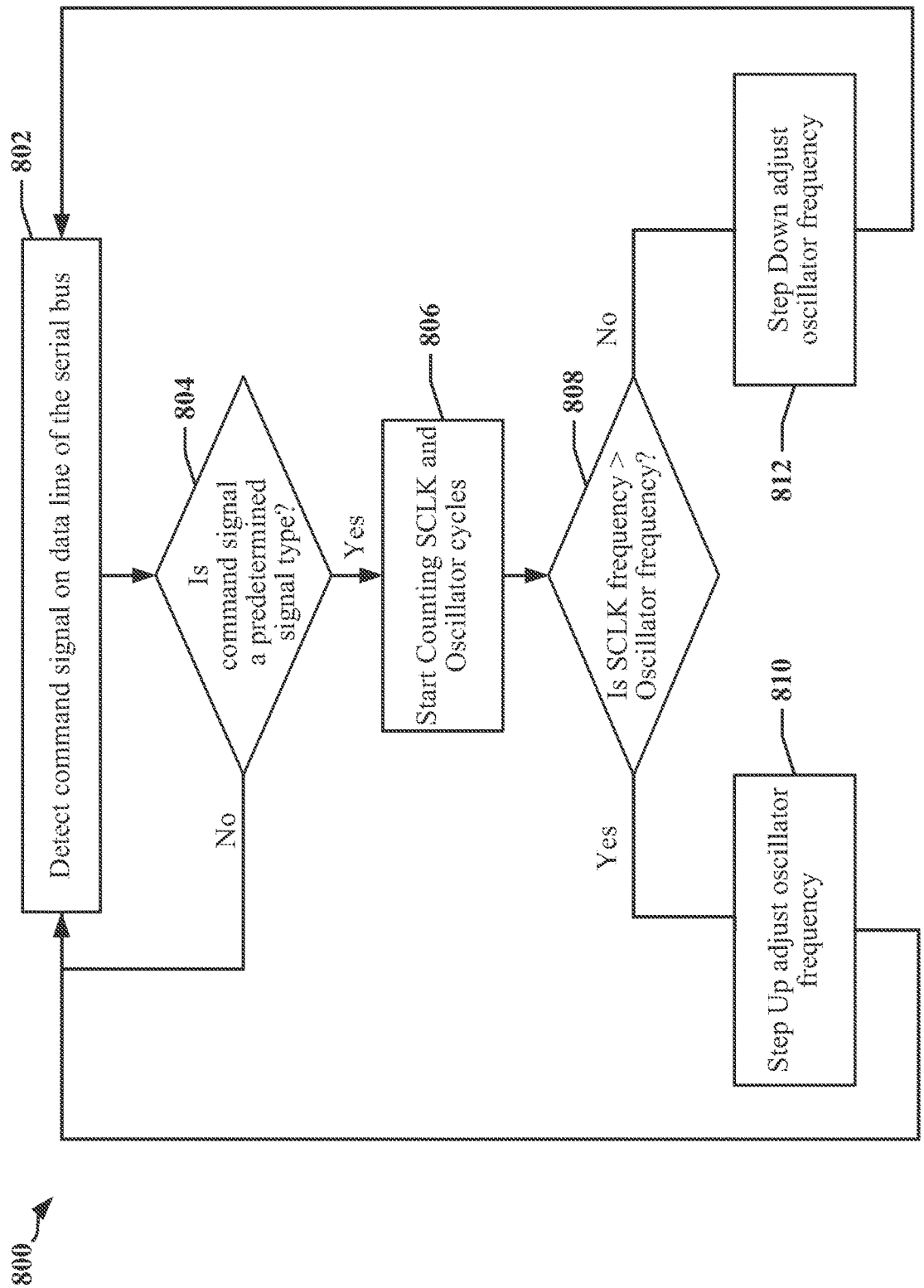
FIG. 8 is a flowchart illustrating certain aspects of the operation of the apparatus illustrated in FIG. 5.

FIG. 8 is a flowchart 800 illustrating certain aspects of the operation of an apparatus for on-chip clock generation and calibration, such as apparatus 500 illustrated in FIG. 5. The flowchart illustrates that the apparatus 500 may first detect when a command signal is present on the data line SDATA of the serial bus as shown at block 802. This process may be effected by the valid command detector 508 shown in FIG. 5, or an equivalent circuitry or logic. In an aspect, it is noted that whether the signal is intended for the device or not, the apparatus may nonetheless detect the presence of a command signal on the bus. When a command signal is present, flow proceeds to block 804 where a determination is made whether the command signal is of a valid or predetermined signal type, such as an Extended Register Write command or an Extended Register Write long command for the case of an RFFE bus. If the command signal is not of the predetermined type, then flow reverts back to block 802 for detection of a next command signal on the bus. Alternatively, if the command signal meets the requisite condition of block 804, flow proceeds to block 806. It is noted that the process of block 804 may be performed by the valid command detector 508 shown in FIG. 5, or an equivalent circuitry or logic.

At block 806, counting of SCLK line clock cycles and the cycles of the internal, on-chip oscillator (e.g., oscillator 516 in FIG. 5) is started. In an aspect, the counters may be implemented as illustrated by counters 512 and 514 shown in FIG. 5, or equivalents thereof. Furthermore, the control of the counters may be effected by the valid command detector 508 illustrated in FIG. 5, or equivalent circuitry or logic configured for performing this functionality.

Next, flow proceeds to decision block 808 where a determination is made whether the SCLK cycle count or corresponding frequency (or a scaled or converted frequency based on the count) used as the target frequency is greater than the oscillator cycle count or corresponding frequency. If yes, this indicates that the oscillator frequency is running behind the target frequency and the frequency of the oscillator should be adjusted up (i.e., a Step Up adjustment) to move toward the target frequency as shown at block 810. Conversely, if the SCLK frequency is not greater than the oscillator frequency, this indicates that the oscillator frequency is running ahead of the target frequency, and the frequency of the oscillator should be adjusted down (a Step down adjustment) to move the oscillator frequency toward the target frequency as shown at block 812. It is noted that for the example of apparatus 500, the comparison process 808 may be implemented with a comparator such as comparator 520, which may further include scaling of one or more of the inputs and/or scaling of the output. The comparison process 808 may also include start and stop control implemented by a logic, such as command detector 508, or equivalent circuitry or logic to perform control of a comparator. Of further note, the control of the comparator may be configured to end the comparison of the counts after the burst clock SCLK ends, or some other predetermined period less than the full burst clock period. The step up or step down signaling to the oscillator for adjusting the oscillator frequency may be accomplished with step-up/step down tuning circuitry 524, for example, or with equivalent circuitry or logic configured to accomplish this functionality.

Examples of Processing Circuits and Methods

Figure 9:
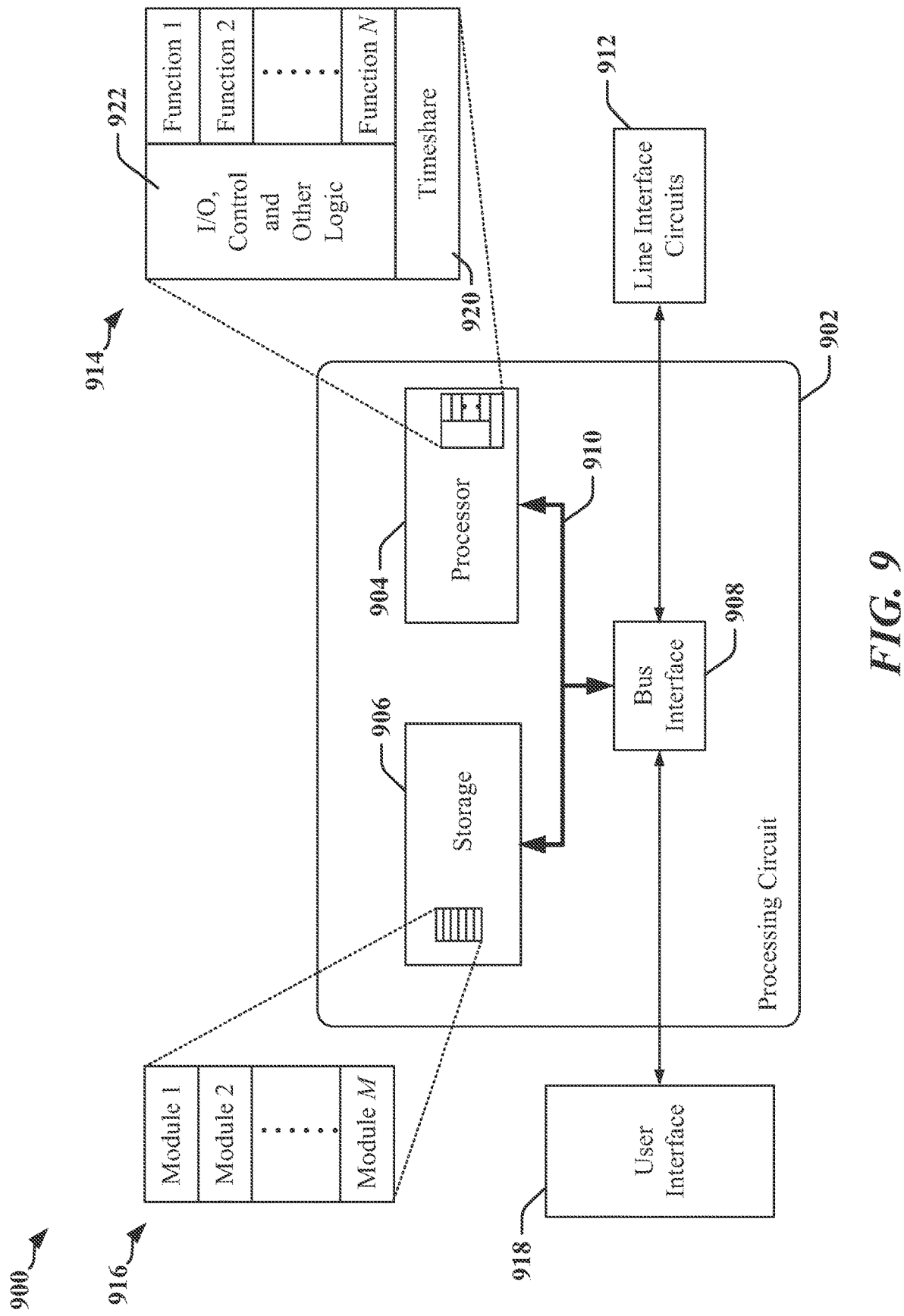
FIG. 9 is a block diagram illustrating an example of an apparatus employing a processing circuit that may be adapted according to certain aspects disclosed herein.

FIG. 9 is a diagram illustrating an example of a hardware implementation for an apparatus 900 employing a processing circuit 902 that may be configured to perform one or more functions disclosed herein. In accordance with various aspects of the disclosure, an element, or any portion of an element, or any combination of elements as disclosed herein may be implemented using the processing circuit 902. The processing circuit 902 may include one or more processors 904 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation. In various examples, the processing circuit 902 may be implemented using a state machine, sequencer, signal processor and/or general-purpose processor, or a combination of such devices and circuits.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912. A transceiver 912 may be provided for each networking technology supported by the processing circuit. In some instances, multiple networking technologies may share some or all of the circuitry or processing modules found in a transceiver 912. Each transceiver 912 provides a means for communicating with various other apparatus over a transmission medium. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as the transceiver 912, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the transceiver 912, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

In an aspect within the context of the present disclosure, the processing circuit 902, as an example, may be implemented as a slave RFFE device. Functionalities and circuitry for implementing aspects of the on-chip clock generation and calibration as disclosed herein may be implemented in conjunction with the processor 904, as one example. Furthermore, the on-chip clock generation and calibration circuitry may be implemented under control of processor 904 in other aspects.

Figure 10:
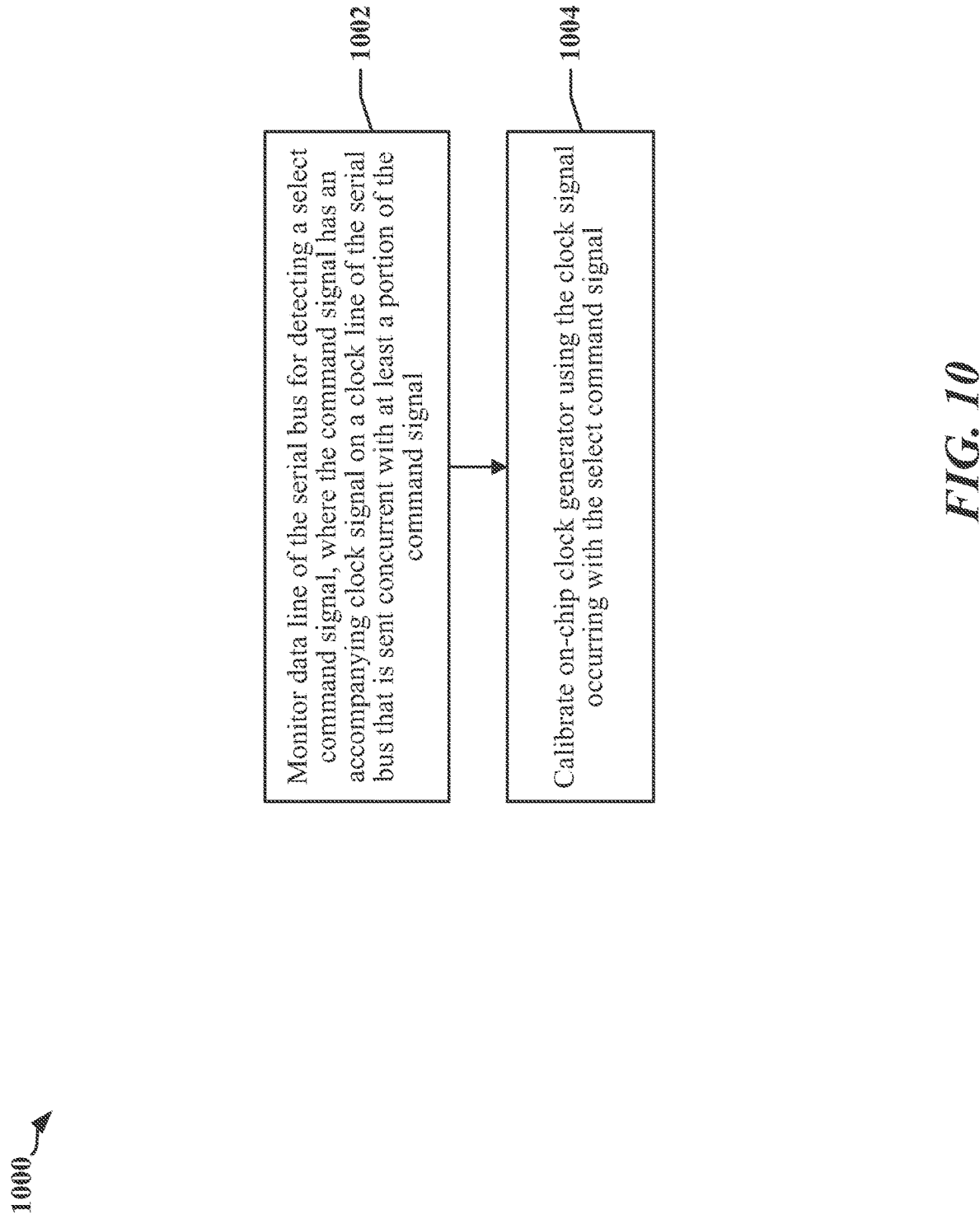
FIG. 10 is a flowchart illustrating certain aspects of the disclosed methods herein.

FIG. 10 is a flowchart illustrating a method 1000 for clock calibration of an on-chip clock generator that may be performed in a slave device coupled to a serial bus. Method 1000 includes monitoring a data line of the serial bus for detecting a select command signal, where the command signal has an accompanying clock signal on a clock line of the serial bus that is sent concurrent with at least a portion of the command signal as shown in block 1002. It is noted that processes of block 1002 may be implemented by valid command detector 508 in one embodiment, or in conjunction with processor 904 in another embodiment. After monitoring for the select command signal, method 1000 includes calibrating the on-chip clock generator using the clock signal occurring with the select command signal as illustrated in block 1004. It is noted that the processes in block 1004 may be implemented, in one embodiment, by the combination of counters 512, 514, comparator 520, and step up/step down tuning circuitry 524 as illustrate in FIG. 5.

In some examples, the clock signal in method 1000 is a temporal burst clock signal occurring on the clock line of the serial bus with the sending of the select command signal on the data line of the serial bus. In some further examples, the calibrating the on-chip clock generator is performed for each burst clock signal that occurs with each transmission of the command signal on the data line of the serial bus.

In yet some further examples, the device in method 1000 is a MIPI Radio Frequency Front End (RFFE) device coupled to the bus, and the serial bus may be one of a MIPI RFFE, bus or a MIPI System Power Management Interface (SPMI) bus.

In still some further examples, method 1000 may include calibrating the on-chip clock generator by comparing a first count of an output of an oscillator within the on-chip clock generator having an output that provides a system clock for the device with a second count of the clock signal on the clock line of the serial bus. The system clock timing (e.g., the timing of oscillator 516) may then be incrementally increased or decreased with a tuning signal (e.g., 526) derived based on the comparison signal derived from the comparison of the first count and the second count. In some other examples, the oscillator comprises a digitally tunable oscillator that receives the tuning signal at an input and outputs the system clock, and may include one of an RC oscillator, a ring oscillator, or a digital oscillator.

In some further examples, method 1000 may include the use of a comparison signal that is configured to be set to any of a plurality of ratios of the first count to the second count where the ratio corresponds to a target clock frequency of the on-chip clock generator. In other examples, the monitoring and calibrating are executed in a self-sustained logic circuitry on-chip in the device. In yet some further examples, the monitoring and calibration are performed in an iterative manner wherein the clock calibration of the on-chip clock generator occurs with each select command signal sent on the serial bus by a master device. Also in some aspects, the select command is a MIPI RFFE command sequence such as an Extended Register Write command sequence or an Extended Register Write Long command sequence.

Figure 11:
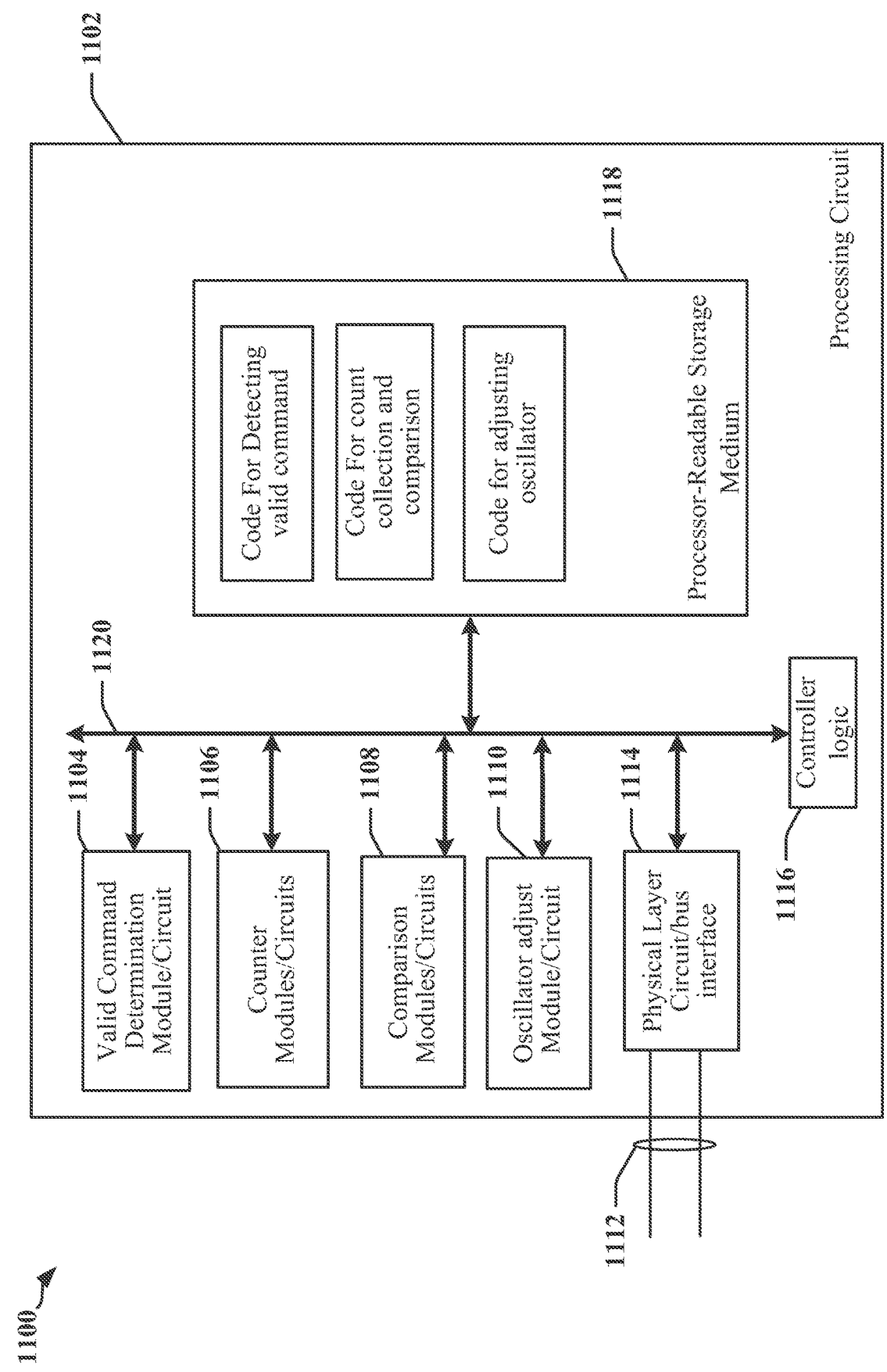
FIG. 11 illustrates a hardware implementation for an apparatus adapted to perform on-chip clock generator calibration in accordance with certain aspects disclosed herein.

FIG. 11 is a diagram illustrating a simplified example of a hardware implementation for an apparatus 1100 employing a processing circuit 1102. The processing circuit typically has a controller logic or processor 1116 that may include one or more microprocessors, microcontrollers, digital signal processors, sequencers and/or state machines. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including one or more processors and/or hardware modules, represented by the controller logic or processor 1116, the modules or circuits 1104, 1106, 1108 and 1110, and the computer-readable storage medium 1118. The apparatus may be coupled to a multi-wire communication link using a physical layer circuit 1114. The physical layer circuit 1114 may operate the multi-wire communication link 1112 to support communications in accordance with RFFE or SPMI protocols. The bus 1120 may also link various other circuits such as timing sources, peripherals, voltage regulators, and power management circuits, which are well known in the art, and therefore, will not be described any further.

The controller logic or processor 1116 may be responsible for general processing, including the execution of software, code and/or instructions stored on the computer-readable storage medium 1118. The computer-readable storage medium may include a non-transitory storage medium. The software, when executed by the controller logic or processor 1116, causes the processing circuit 1102 to perform the various functions described above for any particular apparatus. The computer-readable storage medium may be used for storing data that is manipulated by the processor 1116, when executing software. The processing circuit 1102 further includes at least one of the modules 1104, 1106, 1108, and 1110. The modules 1104, 1106, 1108, and 1110 may include software modules running in the processor 1116, resident/stored in the computer-readable storage medium 1118, one or more hardware modules coupled to the processor 1116, or some combination thereof. The modules 1104, 1106, 1108, and 1110 may include microcontroller instructions, state machine configuration parameters, or some combination thereof.

In one configuration, the apparatus 1100 includes the physical layer circuits 1114 being line driver circuits including a first line driver coupled to a first wire of a multi-wire serial bus and a second line driver coupled to a second wire of the multi-wire serial bus 1112, and line driver configuration modules and/or circuits 1106. In one example, the line driver configuration modules and/or circuits 1106 may cause one or more of the line driver circuits 1114 to operate in a push-pull and/or open-drain mode. The apparatus 1100 may include modules and/or circuits (not shown) that are configured to arbitrate between devices contending for access to the serial bus.

In one example, the apparatus 1100 includes a controller (e.g., controller logic 1116) configured for effectuating clock calibration of an on-chip clock generator that may be performed in a slave device coupled to a serial bus, such as multi-wire serial bus 1112. The controller 1116 may be configured to monitor a data line of the serial bus for detecting a select or valid command signal, where the command signal has an accompanying clock signal on a clock line of the serial bus that is sent concurrent with at least a portion of the command signal. In further aspects, the controller logic 1116 may work in conjunction with valid command determination module/circuit 1104 to make the valid command determination.

The controller 1116 may be further configured to calibrate the on-chip clock generator using the clock signal occurring with the select command signal. In an aspect, the controller 1116 may work in conjunction with one or more counter modules/circuits 1106, comparison modules/circuits 1108, and oscillator adjust module/circuit 1110 to effectuate the calibration. In some examples, the clock signal accompanying the valid command is a temporal burst clock signal occurring on the clock line of the serial bus with the sending of the select command signal on the data line of the serial bus. In some further examples, the calibrating the on-chip clock generator is performed under the control of controller logic 1116 for each burst clock signal that occurs with each transmission of the command signal on the data line of the serial bus.

In yet some further examples, the processing circuit 1102 is contained within a MIPI Radio Frequency Front End (RFFE) device coupled to the bus, and the serial bus may be one of a MIPI RFFE bus or a MIPI System Power Management Interface (SPMI) bus.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As may be appreciated by those skilled in the art, the present disclosure provides an accurately tuned on-chip clock generator without the need for added external connections using an already available burst clock as a reference. The present methods and apparatus afford such accuracy with minimal die or chip area cost and may, when implemented with logic circuitry in certain embodiments, avoid the need for extra software or firmware control.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for." Moreover, the term "or" is intended to mean an inclusive "or" rather than an exclusive "or." That is, unless specified otherwise, or clear from the context, the phrase "X employs A or B" is intended to mean any of the natural inclusive permutations, such as the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for clock calibration of an on-chip clock generator in a device using a serial bus, the method comprising:
   monitoring a data line of the serial bus for detecting a select command signal, where the select command signal has an accompanying clock signal on a clock line of the serial bus that is sent concurrent with at least a portion of a duration of the select command signal; and
   calibrating the on-chip clock generator using the clock signal occurring with the select command signal including counting cycles of the clock signal on the clock line of the serial bus during at least the portion of the duration of the select command signal on the data line of the serial bus.

2. The method of claim 1, wherein the clock signal is a temporal burst clock signal occurring on the clock line of the serial bus with transmission of the select command signal on the data line of the serial bus.

3. The method of claim 2, wherein calibrating the on-chip clock generator is performed for each burst clock signal that occurs with each transmission of the select command signal on the data line of the serial bus.

4. The method of claim 1, wherein the device is a MIPI Radio Frequency Front End (RFFE) device coupled to the serial bus.

5. The method of claim 1, wherein the serial bus is one of a MIPI RFFE bus or a MIPI System Power Management Interface (SPMI) bus.

6. The method of claim 1, wherein calibrating the on-chip clock generator further comprises:
   comparing a first count of an output of an oscillator within the on-chip clock generator having an output that provides a system clock for the device with a second count of the clock signal on the clock line of the serial bus; and
   incrementally increasing or decreasing the system clock with a tuning signal derived based on a comparison signal derived from the comparison of the first count and the second count.

7. The method of claim 6, wherein the oscillator comprises a digitally tunable oscillator that receives the tuning signal at an input and outputs the system clock.

8. The method of claim 6, wherein the oscillator comprises one of an RC oscillator, a ring oscillator, or a digital oscillator.

9. The method of claim 6, wherein the comparison signal is configured to be set to any of a plurality of ratios of the first count to the second count where a ratio corresponds to a target clock frequency of the on-chip clock generator.

10. The method of claim 1, wherein the monitoring and calibrating are executed in a self-sustained logic circuitry on-chip in the device.

11. The method of claim 1, wherein the monitoring and calibrating are performed in an iterative manner wherein the clock calibration of the on-chip clock generator occurs with each select command signal sent on the serial bus by a master device.

12. The method of claim 1, wherein the select command signal comprises a MIPI RFFE command sequence selected from the group consisting of an Extended Register Write command sequence and an Extended Register Write Long command sequence.

13. A device coupled to a serial bus comprising:
   an on-chip clock generator within the device comprising:
   a command detector configured to monitor a data line of the serial bus for detecting a select command signal, where the select command signal has an accompanying clock signal on a clock line of the serial bus that is sent concurrent with at least a portion of a duration of the select command signal;
   a tunable oscillator providing an internal clock signal for the device;
   a first counter configured to count cycles of the internal clock signal output from the tunable oscillator during at least the portion of the duration of the select command signal;
   a second counter configured to count cycles of the clock signal on the clock line of the serial bus during at least the portion of the duration of the select command signal; and
   a tuning circuit configured to adjust a frequency of the tunable oscillator based on a comparison of the counted clock cycles from the first and second counters.

14. The device of claim 13, wherein the clock signal on the clock line of the serial bus is a temporal burst clock signal occurring with transmission of the select command signal on the data line of the serial bus.

15. The device of claim 14, wherein adjusting the frequency of the tunable oscillator is performed for each burst clock signal that occurs with each transmission of the select command signal on the data line of the serial bus.

16. The device of claim 14, wherein the device is a MIPI Radio Frequency Front End (RFFE) slave device coupled to the serial bus.

17. The device of claim 13, wherein the serial bus is one of a MIPI RFFE bus or a MIPI System Power Management Interface (SPMI) bus.

18. The device of claim 13, further comprising:
   a comparator configured to compare the counted cycles of the internal clock signal output from the tunable oscillator and the counted cycles of the clock signal on the clock line of the serial bus; and
   the tuning circuit further configured to adjust the frequency of the tunable oscillator by incrementally increasing or decreasing the frequency of the tunable oscillator with a tuning signal derived based on a comparison signal derived from the comparison of the counted cycles of the internal clock signal output from the tunable oscillator and the counted cycles of the clock signal on the clock line of the serial bus.

19. The device of claim 18, wherein the tunable oscillator comprises a digitally tunable oscillator that receives the tuning signal at an input and outputs the internal clock signal.

20. The device of claim 19, wherein the tunable oscillator comprises one of an RC oscillator, a ring oscillator, or a digital oscillator.

21. The device of claim 18, wherein the comparator is configured to be set to any of a plurality of ratios of the counted cycles of the internal clock signal output from the tunable oscillator and the counted cycles of the clock signal on the clock line of the serial bus where a ratio corresponds to a target clock frequency of the internal clock signal.

22. The device of claim 13, wherein the on-chip clock generator is configured to operate in an iterative manner wherein adjusting the frequency of the tunable oscillator occurs with each select command signal sent on the serial bus by a master device.

23. The device of claim 13, wherein the select command signal comprises a MIPI RFFE command sequence selected from the group consisting of an Extended Register Write command sequence and an Extended Register Write Long command sequence.

24. An apparatus, comprising:
a bus interface configured to couple the apparatus to a serial bus having a first line configured to carry a clock signal and a second line configured to carry data and command signals;
an on-chip clock generator for providing an internal clock signal for the apparatus; and
a controller configured to:
monitor the second line of the serial bus for detecting a select command signal, where the select command signal has an accompanying clock signal on the first line of the serial bus that is sent concurrent with at least a portion of a duration of the select command signal; and
calibrate the on-chip clock generator using the clock signal occurring with the select command signal including counting cycles of the clock signal on the clock line of the serial bus during at least the portion of the duration of the select command signal on the data line of the serial bus.

25. The apparatus of claim 24, wherein the controller is further configured to calibrate the on-chip clock generator for each burst clock signal that occurs on the first line with each transmission of the select command signal on the second line of the serial bus.

26. The apparatus of claim 24, wherein the apparatus is a MIPI Radio Frequency Front End (RFFE) slave device coupled to the serial bus.

27. The apparatus of claim 24, wherein the select command signal comprises a MIPI RFFE command sequence selected from the group consisting of an Extended Register Write command sequence and an Extended Register Write Long command sequence.

28. An apparatus for clock calibration of an on-chip clock generator in a device using a serial bus, the apparatus comprising:
means for monitoring a data line of the serial bus for detecting a select command signal, where the select command signal has an accompanying clock signal on a clock line of the serial bus that is sent concurrent with at least a portion of a duration of the select command signal; and
means for calibrating the on-chip clock generator using the clock signal occurring with the select command signal including means for counting cycles of the clock signal on the clock line of the serial bus during at least the portion of the duration of the select command signal on the data line of the serial bus.

29. The apparatus of claim 28, wherein the means for calibrating is further configured to calibrate the on-chip clock generator for each burst clock signal that occurs on the clock line with each transmission of the select command signal on the data line of the serial bus.

30. The apparatus of claim 28, further comprising:
means for comparing a first count of an output of an oscillator within the on-chip clock generator having an output that provides a system clock for the apparatus with a second count of the clock signal on the clock line of the serial bus; and
means for incrementally increasing or decreasing the system clock with a tuning signal derived based on a comparison signal derived from the comparison of the first count and the second count.

* * * * *